E. W. HILL.
DEVICE FOR PREPARING STENCIL SHEETS.
APPLICATION FILED OCT. 12, 1915.
1,214,785.   Patented Feb. 6, 1917.
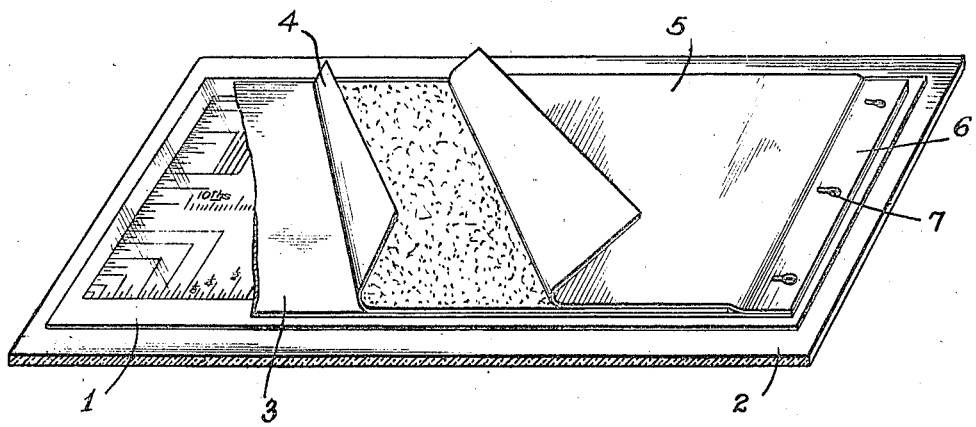
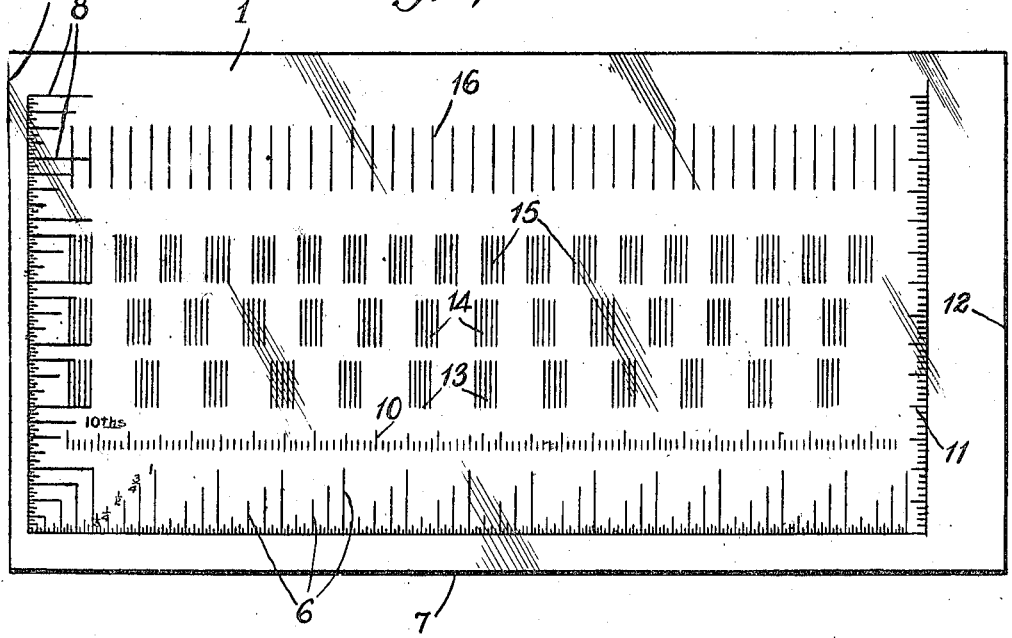
INVENTOR
Edward W. Hill
BY J. C. Edmonds
ATTORNEY

UNITED STATES PATENT OFFICE.

EDWARD W. HILL, OF CHICAGO, ILLINOIS, ASSIGNOR TO A. B. DICK COMPANY, OF CHICAGO, ILLINOIS, A CORPORATION OF ILLINOIS.

DEVICE FOR PREPARING STENCIL-SHEETS.

1,214,785.      Specification of Letters Patent.      Patented Feb. 6, 1917.

Application filed October 12, 1915. Serial No. 55,365.

*To all whom it may concern:*

Be it known that I, EDWARD W. HILL, a citizen of the United States, residing at Chicago, in the county of Cook and State of Illinois, have invented certain new and useful Improvements in Devices for Preparing Stencil-Sheets, of which the following is a specification.

My invention relates to devices for preparing stencil-sheets, and particularly to a scale sheet of transparent material having spaced rulings thereon which is used in conjunction with the stencil-sheet and preferably with other devices, as will be pointed out, in preparing the stencil.

My devices are particularly adapted for use when drawings or form matter are intended to be stenciled. In this case, the transparent sheet having scale rulings thereon, which I term a scale sheet, is placed upon a glass or other transparent plate through which light shines from a source placed beneath the plate. A stencil-sheet is placed above the scale sheet and held flat thereon, the scale rulings on the scale sheet being plainly visible through the stencil-sheet because of the illumination furnished by the lamp or other source of light referred to. Preferably, for reasons to be explained, a transparent flexible sheet having a slightly roughened surface is interposed between the scale sheet and the stencil-sheet, in which case the rulings on the scale sheet are visible through the stencil-sheet as before. Parallel or normal lines may now be ruled upon the stencil-sheet, with the aid of a T square or the like in accordance with the rulings on the scale sheet, and the rulings thus made may be used in the preparation of mechanical or other drawings, or in the preparation of other matter to be stenciled involving the use of a definite scale.

The scale sheet is preferably a thin sheet of celluloid, bearing on one face thereof spaced lines variously placed and formed in various series, each series on a different scale, to aid in the preparation of stencils for various purposes, as will be explained.

In order that a clearer understanding of my invention may be had, attention is hereby directed to the accompanying drawings forming part of this application and illustrating certain embodiments of my invention.

In the drawings, Figure 1 represents a perspective view, partly broken away, of a scale sheet, a flexible writing plate and a stencil-sheet laid upon a glass plate, and Fig. 2 is a plan view of the scale sheet.

Referring to the drawings, the scale sheet 1 is adapted to be laid upon the glass plate 2, which forms the horizontal upper surface of an apparatus in which an electric lamp, or other source of illumination, may be placed. The backing-sheet 3 of the stencil is represented in the drawings as laid above the scale sheet, the flexible writing plate 4 being represented as interposed between the backing-sheet 3 and the stencil-sheet 5, which is secured to the backing-sheet at its stub end 6, by adhesive in the well-known manner, the buttonholes 7 being provided at end 6, whereby the stencil may be secured to the drum of a stencil-duplicating machine in the well-known manner. If the backing-sheet 3 is placed above the scale sheet as illustrated, it may be oiled or otherwise rendered sufficiently transparent. It is not necessary, however, to position the backing-sheet 3 above the scale sheet, as the backing-sheet may be extended beyond the right hand end of the plate 2, shown in Fig. 1, out of the way, in which case the flexible writing plate 4 is laid directly upon the scale sheet with the stencil-sheet 5 positioned upon plate 4.

The rulings upon scale sheet 1, as stated, are of various series and made to different scales. Thus the series of rulings 6 drawn at right angles to the lower edge 7 of the sheet are illustrated as representing sixteenths of an inch, as well as the multiples of the same such as eighths and quarters of an inch. The rulings 8 at right angles to the left hand edge 9 of the sheet are represented as being drawn to the same scale, namely, sixteenths, eighths, etc., of an inch. The scale 10 parallel to the scale 6 represents tenths of an inch and the scale 11 at right angles thereto, adjacent the right hand edge 12 of the sheet is likewise drawn to represent tenths of an inch. The series of parallel lines 13, 14 and 15 are intended to facilitate the copying of music, each of these series of lines representing the staff lines of the music, the groups of staff lines in each series being spaced a different distance apart from the groups of staff lines in each of the other series, in order that a desired spacing may be utilized by the user of the apparatus.

The series of parallel lines 16 adjacent the upper edge of the sheet are equally spaced and are intended for guiding lines when autographic matter is to be stenciled.

Various uses for the scale sheet will be apparent, and include various species of engineering and form work. For example, if it be desired to make cross-section or quadrille ruled scale paper, as employed by engineers and in design work, figured either four, eight or ten lines to the inch, or the like, the stencil is prepared by placing the stencil-sheet upon the scale sheet in the manner described and ruling the spaced lines thereon at right angles to each other, in alinement with the desired rulings of the scales 6 and 8, or 10 and 11, which are visible through the stencil-sheet. The stencil thus prepared may be used for the duplication of such quadrille paper in the usual manner. If stencils of music are to be made, a sheet of light weight paper may be positioned over the scale sheet in place of the flexible writing plate 4 and the arrangement of music staves best suited to the needs of the user selected from the series of scale lines 13, 14 and 15. These lines may then be ruled on the sheet of paper with the aid of a T square, whereby a sheet of music rulings suited for permanent use is prepared which may be placed beneath the writing plate 4 to serve as guide lines whenever stencils are to be made of music in which the particular staff line spacing corresponding to the rulings made is the one required. For making stencils of plain hand writing, a set of lines can be drawn, as by a lead pencil, over the surface of scale sheet 1 in alinement with the lines 16, or such set of lines may be formed on any sheet of light weight paper which may be positioned above the scale sheet, and the sheet containing these guide lines placed upon the glass surface immediately beneath the flexible writing plate 4 above which is positioned the stencil-sheet upon which the hand writing is to be formed. As another example of the use of the scale sheet, a typewritten or otherwise formed stencil of the heading of a commercial form of greater or less elaborateness may be positioned over the flexible writing plate and scale sheet, whereupon the various horizontal lines and vertical column rulings required by the form can be laid out directly on the stencil by the use of the various scale divisions of the scale sheet which are visible through the stencil-sheet. The various rulings of the scale sheet should be formed with a black or very dark ink, of a permanent character, upon one face of the scale sheet. The rulings being slightly raised may slightly roughen this surface of the scale sheet and this surface should be placed next the glass plate 2 with the desirable effect that the ruled lines tend to prevent the slipping of the scale sheet upon the surface of glass plate 2 when the sheet has been positioned. Likewise, the upper surface of the scale sheet being smooth will afford no roughness which might interfere with the preparation of the stencil placed above the same.

The stencil-sheet with which the scale sheet is adapted to coact may be of any desired character. It is, however, preferably a composite stencil-sheet of the character known as "dermatype" paper embodying the inventions of Letters Patent Nos. 1,101,260, 1,101,268, 1,101,269 and 1,101,270. In this material, the stencil-sheet proper is composed of a very thin base of Yoshino, provided with a suitable coating such as coagulated protein. With such a stencil the desired lines of rulings may be readily made by the use of a stylus, in the form either of a wheel or a rounded point.

The flexible writing plate 4 described is made in accordance with the disclosure of my application Serial No. 51,324, Method of and apparatus for preparing stencil-sheets for duplicating, filed September 18, 1915. As there described, the flexible writing sheet is formed of celluloid, or other transparent flexible material, having its upper surface, or both its upper and lower surfaces slightly roughened, as for instance, by pressing the same against a sand-blasted metal or glass. The roughened upper surface of this writing plate 4 serves the purpose of holding a sufficient quantity of moisture to maintain the stencil-sheet in usable condition, while the stencil is being prepared, the stencil-sheets of the character particularly referred to preferably being softened by the application of moisture thereto when they are to be stencilized. This writing plate being transparent does not detract from the visibility of the scale lines of sheet 1, through the stencil sheet. The slight roughness of the writing plate 4 aids in preventing relative slipping between the members referred to, namely, the scale sheet, the writing plate and the stencil-sheet, when the same are positioned in the manner described.

Having now described my invention, what I claim as new therein and desire to secure by Letters Patent is as follows:—

1. In stencil-making apparatus, a sheet of thin transparent material having spaced rulings thereon in various series, different series being formed to different scales, lines of one series extending inwardly at right angles from a side edge and an end edge of the sheet, said lines being adapted to act as guides for ruling scaled quadrilles on paper placed above the sheet; and other series of lines in the central portion of the sheet, parallel to an end edge, adapted to act as guides for ruling staff lines of music, lines of said series being arranged in groups of five each, the groups of one series being spaced apart different distances from the groups of another of said series, substantially as set forth.

2. In stencil-making apparatus, a sheet of thin transparent material having spaced rulings thereon in various series, different series being formed to different scales, lines of one series extending inwardly at right angles from a side edge and an end edge of the sheet, said lines being adapted to act as guides for ruling scaled quadrilles on paper placed above the sheet; and other series of lines in the central portion and adjacent the opposite side edge of the sheet, one of said series being composed of parallel lines arranged in groups of five each, said groups being separated by distances different from the distances between lines in a group, and another of said series having lines spaced equidistantly, substantially as set forth.

This specification signed and witnessed this 9th day of October, 1915.

EDWARD W. HILL.

Witnesses:
H. H. MULRAN,
JOSEPH TEAL.